United States Patent
Gutierrez-Lemini et al.

(10) Patent No.: US 8,128,129 B2
(45) Date of Patent: Mar. 6, 2012

(54) DOUBLE-ENDED FLEXIBLE PIPE JOINT HAVING STACKED CO-AXIAL PRIMARY AND SECONDARY ANNULAR ELASTOMERIC FLEX ELEMENTS

(75) Inventors: Danton Gutierrez-Lemini, Grand Prairie, TX (US); George W. Peppel, Corsicana, TX (US); Jesner H. Pereira, Arlington, TX (US); James G. Patrick, Azie, TX (US); Carl C. Spicer, Grand Prairie, TX (US); Gregory P. Cruse, Arlington, TX (US); Todd M. Pottorff, Crowley, TX (US)

(73) Assignee: Oil States Industries, Inc., Arlington, TX (US)

( * ) Notice: Subject to any disclaimer, the term of this patent is extended or adjusted under 35 U.S.C. 154(b) by 411 days.

(21) Appl. No.: 12/503,676

(22) Filed: Jul. 15, 2009

(65) Prior Publication Data

US 2011/0012343 A1 Jan. 20, 2011

(51) Int. Cl.
*F16L 27/10* (2006.01)
(52) U.S. Cl. ..................... 285/223; 285/146.3
(58) Field of Classification Search .................. 285/268, 285/267, 223, 263, 270, 123.17, 146.2, 146.3, 285/41; 405/167, 170
See application file for complete search history.

(56) References Cited

U.S. PATENT DOCUMENTS 2,900,182 A 8/1959 Hinks
(Continued)

OTHER PUBLICATIONS

Cullity, B.D., and Graham, C.D., Introduction to Magnetic Materials, 2009, p. 484-485, John Wiley & Sons, Inc., Hoboken, NJ.

*Primary Examiner* — Aaron Dunwoody
(74) *Attorney, Agent, or Firm* — Richard Auchterlonie; Novak Druce & Quigg, LLP

(57) ABSTRACT

A double-ended flexible pipe joint has first and second extension pipes extending from opposite ends of an outer housing, and first and second primary annular elastomeric flex elements mounting the first and second extension pipes to the outer housing. An inner housing is disposed in the outer housing, and first and second secondary annular elastomeric flex elements disposed in the inner housing mount the first and second extension pipes to the inner housing. Tension upon the first and second extension pipes places each of the first and second primary flex elements and each of the first and second secondary flex elements in compression. The first and second secondary flex elements contain fluid pressure within the first and second extension pipes so that the first and second primary flex elements are not subjected to the fluid pressure within the extension pipes.

20 Claims, 7 Drawing Sheets

U.S. PATENT DOCUMENTS

| | | |
|---|---|---|
| 3,429,622 A | 2/1969 | Lee et al. |
| 3,519,260 A | 7/1970 | Irwin |
| 3,680,895 A | 8/1972 | Herbert et al. |
| 3,941,433 A | 3/1976 | Dolling et al. |
| 3,958,840 A | 5/1976 | Hickox et al. |
| 4,068,864 A | 1/1978 | Herbert et al. |
| 4,068,868 A | 1/1978 | Ohrt |
| 4,105,266 A | 8/1978 | Finney |
| 4,121,861 A | 10/1978 | Gorndt |
| 4,183,556 A | 1/1980 | Schwemmer |
| 4,263,243 A | 4/1981 | Wilson et al. |
| 4,273,363 A | 6/1981 | Angel |
| 4,324,194 A | 4/1982 | Elliston |
| 4,416,473 A | 11/1983 | Lamy et al. |
| 4,515,399 A * | 5/1985 | Sullivan et al. ............... 285/95 |
| 4,593,941 A * | 6/1986 | Whightsil, Sr. ............ 285/145.5 |
| 4,706,998 A * | 11/1987 | Peppel et al. ............... 285/146.3 |
| 4,708,758 A | 11/1987 | McGregor |
| 4,759,662 A | 7/1988 | Peppel |
| 4,784,410 A | 11/1988 | Peppel et al. |
| 4,984,827 A | 1/1991 | Peppel et al. |
| 5,133,578 A | 7/1992 | Whightsil, Sr. et al. |
| 5,269,629 A | 12/1993 | Langner |
| 5,482,406 A | 1/1996 | Arlt, III |
| 5,641,248 A | 6/1997 | Arlt, III |
| 5,791,695 A | 8/1998 | Snider |
| 5,905,212 A | 5/1999 | Moses et al. |
| 5,951,061 A | 9/1999 | Arlt, III et al. |
| 6,739,804 B1 | 5/2004 | Haun |
| 7,341,283 B2 | 3/2008 | Moses et al. |
| 8,016,324 B2 * | 9/2011 | Gutierrez-Lemini et al. 285/223 |
| 8,038,177 B2 * | 10/2011 | Gutierrez-Lemini et al. 285/223 |

* cited by examiner

DOUBLE-ENDED FLEXIBLE PIPE JOINT HAVING STACKED CO-AXIAL PRIMARY AND SECONDARY ANNULAR ELASTOMERIC FLEX ELEMENTS

FIELD OF THE INVENTION

The present invention relates to a double-ended flexible pipe joint having first and second extension pipes extending from opposite ends of a common housing, and at least a first annular elastomeric flex element for mounting the first extension pipe to the housing, and a second annular elastomeric flex element for mounting the second extension pipe to the housing.

BACKGROUND OF THE INVENTION

Flexible joints having an annular elastomeric flex element mounting an extension to a housing are used for reducing motion-induced stresses between floating offshore facilities and risers and tendons depending from the floating offshore facilities. Typically the flex element consists of alternating spherical shims of metal, or other stiff material, and layers of elastomeric material. Such a flex element is capable of providing a free angular displacement of about ±15 degrees or more while supporting an axial tension proportional to the size of the flex element. Typically the size of the flex element has been selected to handle the desired load upon the riser or tendon, and flex elements have been manufactured and stocked in various sizes for handling various standard sizes of risers or tendons.

Risers are used for transfer of production fluids from the sea floor up to a deck of a floating offshore vessel, and for transfer of the production fluid off the vessel to one or more export lines. The loads impressed by the riser on a flex element typically consist of tension in the riser, angular displacement and rotation of the riser, internal pressure in the production fluid, and increased temperature from the production fluid. Thus, the internal pressure in the production fluid, and increased temperature from the production fluid, may make the selection of a flex element for a riser more difficult than the selection of a flex element for a tendon.

For various applications, flexible pipe joints have incorporated more than one flex element in a common housing. For example, a double-ended flexible pipe joint for a riser has a first flex element in the housing for mounting a first extension pipe to the housing, and a second flex element in the housing for mounting a second extension pipe to the housing. The two extension pipes extend in opposite directions from the common housing. In this fashion, the double-ended flexible pipe joint can accommodate twice the angular displacement than can be tolerated by a single-ended flexible pipe joint having a single flex element. The angular displacement is divided between the two flex elements in the double-ended flexible pipe joint, but each of the two flex elements carries the same full tension of the riser. Examples of such double-ended flexible pipe joints are found in Herbert et al. U.S. Pat. No. 3,680,895 issued Aug. 1, 1972; Herbert et al. U.S. Pat. No. 4,068,864 issued Jan. 17, 1978 (see FIG. 4); and Whightsil, Sr. et al. U.S. Pat. No. 5,133,578 issued Jul. 28, 1992.

Flexible pipe joints have incorporated more than one flex element in a common housing so that two flex elements are subjected to the same angular displacement yet only one of these two flex elements carries the tensile load upon the flexible pipe joint. Such an arrangement may reduce pressure from production fluid on each flex element and provide both a primary and a backup sealing mechanism for containing the pressurized production fluid within the pipe joint. However, the flex elements in these concepts need to be pre-compressed for proper functioning; a fact that reduces the usable life of the flex elements. Thus, these designs make an inefficient use of the two flex elements both to carry the axial load upon the pipe and to seal the pressure. Examples of such flexible pipe joints are found in Schwemmer U.S. Pat. No. 4,183,556 issued Jan. 15, 1980; Ohrt U.S. Pat. No. 4,068,868 issued Jan. 17, 1978; Peppel et al. U.S. Pat. No. 4,784,410 issued Nov. 15, 1988; and Peppel et al. U.S. Pat. No. 4,984,827 issued Jan. 15, 1991.

A pipe joint having two flex elements in a common housing and different levels of axial pre-compression upon the two flex elements is disclosed in Lamy et al. U.S. Pat. No. 4,416,473 issued Nov. 23, 1983. The two flex elements are arranged on opposite sides of a common center of rotation. The pipe joint has a flange and a collar forming a spherical bearing permitting angular displacement but preventing relative movement under axial compression. (Lamy, col. 5, lines 2-8.) One flex element having a larger diameter takes up axial tensile loads. The other flex element having a smaller diameter is designed to ensure solely the sealing of the fluid within the pipe. (Lamy, col. 5 lines 16-34.) A desired axial pre-stress is applied to the flex element having the smaller diameter by pulling bolts up tighter to close a clearance of a cylindrical opening. (Lamy, col. 6, lines 30-46.)

SUMMARY OF THE INVENTION

For handling high fluid pressure within a flexible pipe joint, it is desired for the flexible pipe joint to include at least one primary elastomeric flex element for handling axial loads upon the pipe joint, and at least one secondary elastomeric flex element especially designed for containing the fluid pressure within the flexible pipe joint and eliminating fluid pressure upon the primary flex element. By eliminating fluid pressure upon the primary flex element, the size of the primary flex element can be reduced, and its lifetime can be extended.

In accordance with a first aspect, the invention provides a double-ended flexible pipe joint. The double-ended flexible pipe joint includes an outer housing, a first extension pipe extending from a first end of the housing, a second extension pipe extending from a second end of the housing, a first primary annular elastomeric flex element disposed in the housing and mounting the first extension pipe to the housing, and a second primary annular elastomeric flex element disposed in the housing and mounting the second extension pipe to the housing. The double-ended flexible pipe joint further includes an inner housing disposed within the outer housing, a first secondary annular elastomeric flex element disposed in the inner housing and mounting the first extension pipe to the inner housing, and a second secondary annular elastomeric flex element disposed in the inner housing and mounting the second extension pipe to the inner housing. Tension upon the first and second extension pipes places each of the first and second primary flex elements and each of the first and second secondary flex elements in compression. In addition, the first and second secondary flex elements are mounted to the inner housing for containing fluid pressure within the first and second extension pipes so that the first and second primary flex elements are not subjected to the fluid pressure within the first and second extension pipes.

In accordance with another aspect, the invention provides a double-ended flexible pipe joint. The double-ended flexible pipe joint includes an outer housing having a first end and a second end, a first extension pipe extending from the first end of the outer housing, the first extension pipe having an inner flange within the outer housing and an outer flange within the outer housing, a first primary annular elastomeric flex element disposed within the outer housing and mounting the outer flange of the first extension pipe to the outer housing, a second extension pipe extending from the second end of the outer housing, the second extension pipe having an inner flange within the outer housing and an outer flange within the outer housing, and a second primary annular elastomeric flex element disposed within the outer housing and mounting the outer flange of the second extension pipe to the outer housing. The double-ended flexible pipe joint further includes an inner housing disposed within the outer housing. The inner flange of the first extension pipe is disposed within the inner housing, and the inner flange of the second extension pipe is disposed within the inner housing. The double-ended flexible pipe joint further includes a first secondary annular elastomeric flex element disposed within the inner housing and mounting the inner flange of the first extension pipe to the inner housing, and a second secondary annular elastomeric flex element disposed within the inner housing and mounting the inner flange of the second extension pipe to the inner housing. Tension upon the first and second extension pipes places each of the first and second primary flex elements and each of the first and second secondary flex elements in compression. In addition, the first and second secondary flex elements are mounted to the inner housing for containing fluid pressure within the first and second extension pipes so that the first and second primary flex elements are not subjected to the fluid pressure within the first and second extension pipes.

In accordance with still another aspect, the invention provides a double-ended flexible pipe joint. The double-ended flexible pipe joint includes an outer housing having a first end and a second end, a first extension pipe extending from the first end of the outer housing, the first extension pipe having an inner flange within the outer housing and an outer flange within the outer housing, a first primary annular elastomeric flex element disposed within the outer housing and mounting the outer flange of the first extension pipe to the outer housing, a second extension pipe extending from the second end of the outer housing, the second extension pipe having an inner flange within the outer housing and an outer flange within the outer housing, and a second primary annular elastomeric flex element disposed within the outer housing and mounting the outer flange of the second extension pipe to the outer housing. The double-ended flexible pipe joint further includes an inner housing disposed within the outer housing. The inner flange of the first extension pipe is disposed within the inner housing, and the inner flange of the second extension pipe is disposed within the inner housing. The double-ended flexible pipe joint further includes a first secondary annular elastomeric flex element disposed within the inner housing and mounting the inner flange of the first extension pipe to the inner housing, and a second secondary annular elastomeric flex element disposed within the inner housing and mounting the inner flange of the second extension pipe to the inner housing. Tension upon the first and second extension pipes places each of the first and second primary flex elements and each of the first and second secondary flex elements in compression. In addition, the first and second primary flex elements and the first and second secondary flex elements are stacked in a coaxial fashion and share a common center of rotation. The first and second primary flex elements are disposed at a common first radius from the common center of rotation, the first and second secondary flex elements are disposed at a common second radius from the common center of rotation, and the second radius is smaller than the first radius.

BRIEF DESCRIPTION OF THE DRAWINGS

Additional features and advantages of the invention will be described below with reference to the drawings, in which.

Figure 1:
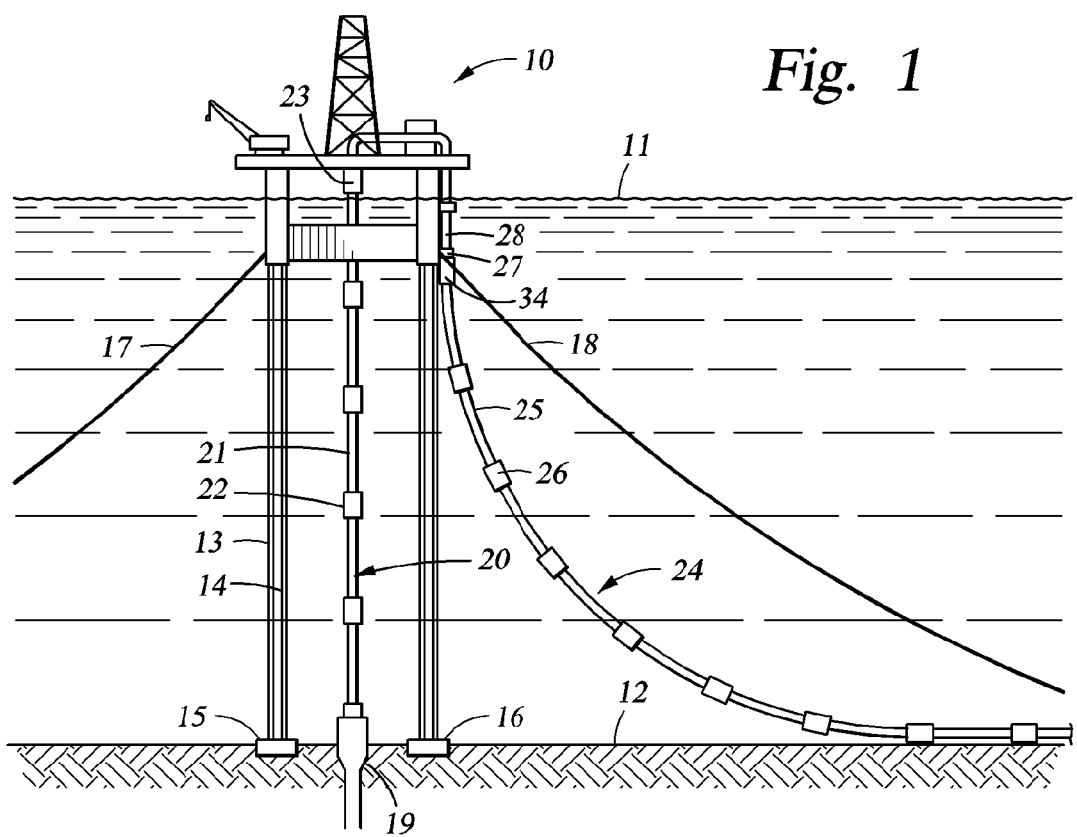
FIG. 1 is a schematic diagram of a tension leg platform (TLP) including a production riser and an export riser in a catenary configuration.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown an offshore drilling and production vessel generally designated 10 floating on a water surface 11. The floating vessel in particular is a tension leg platform (TLP) secured to the seabed 12 by means of tendons 13, 14 and foundation templates 15, 16. Although not visible in FIG. 1, there is a set of tendons depending from each of four corners of the TLP platform 10 to a respective one of four foundation templates 15, 16. In addition, each of the four lower corners of the TLP platform 10 is secured by a respective lateral mooring line 17, 18 used to move the platform laterally and to resist lateral storm loadings.

For conveying drilling fluids and a drill string from the TLP to a well bore 19 in the seabed 12, and for removing hydrocarbons from the well when drilling has been completed, a production riser generally designated 20 extends from the well bore 19 up to the TLP 10. The riser 20 consists of a number of rigid pipe sections 21 joined by double-ended flexible pipe joints 22.

Also shown in FIG. 1 is an export riser generally designated 24 hanging from a leg of the TLP 10 in a catenary configuration and touching down on the seabed 12. The export riser 24, for example, is a pipeline from the TLP 10 to an on-shore facility (not shown), or to a buoy system for loading floating production storage and offloading vessels (FPSO's). The export riser 24 is similar to the production riser 20 in that it is comprised of a number of rigid pipe sections 25 joined by double-ended flexible pipe joints 26. A single-ended flexible pipe joint 27 at the top of the riser 24 is mounted in a side entry slotted receptacle 34 attached to a leg of the TLP 10.

Flexible joints for risers have been manufactured and stocked in various sizes for handling various standard sizes of risers. However, situations may arise where it would be desirable to increase the load bearing capacity or useable lifetime of a double-ended flexible joint for a given housing size. For example, there has been a trend toward drilling offshore wells in the seabed at increasing depths below the water surface 11, and at increasing depths below the seabed 12. Offshore wells in the seabed at increased depths below the water surface require longer risers that have subjected the flexible pipe joints to increased axial, angular displacement, and torsion loads from deep-water currents and displacement of the floating offshore platform during storms. Offshore wells at increased depths below the seabed have produced production fluid at increased temperature and pressure.

Excessive peak loads are especially troublesome when a flexible pipe joint is conveying high-temperature production fluid. For example, the elastomer in conventional flexible pipe joints becomes degraded when subjected to temperatures in excess of about 180 degrees F. (82 degrees C.). Under normal loading, operation at high temperatures will shorten the service life of the flexible pipe joint in a more or less predictable fashion. Under excessive peak loads, operation at high temperatures may quickly result in a need for replacement of the flex elements in the flexible pipe joint.

For continuous handling of high-temperature production fluid, a conventional elastomeric flex element can be shielded from the heat of the production fluid so that the flex element is not subjected to temperature in excess of 180 degrees F. (82 degrees C.). For example, a high-temperature flexible pipe joint including a suitable heat shield is described in Moses et al., U.S. Pat. No. 7,341,283 issued Mar. 11, 2008. It is convenient to use such a high-temperature flexible pipe joint for the single-ended flexible pipe joints 23 and 27 mounted to the TLP 10 in FIG. 1. The double-ended flexible pipe joints 22 and 26 in FIG. 1, however, present additional challenges when handling high-temperature production fluid. One challenge is a desire for the double-ended flexible pipe joints 22 and 26 to be relatively small in size and weight. Another challenge is to provide resistance to peak axial compression loads upon the double-ended flexible pipe joints.

It is desired for the double-ended flexible pipe joints to be relatively small in weight because the weight of the double-ended flexible pipe joints in a riser increases the axial tension load at the top of the riser. A relatively small size and weight also tends to decrease the cost of manufacturing, transporting, and installing the double-ended flexible pipe joints.

It is desired for the double-ended flexible pipe joints to be resistant to peak axial compressive loads. It is relatively unlikely for the single-ended flexible pipe joints 23, 34 at the top of the risers 20, 24 to be subjected to peak axial compressive loads because they normally are subjected to axial tension from the weight of the riser. Double-ended flexible pipe joints near the bottom of a riser, however, are subjected to a substantially reduced axial tension, which may be more easily overcome by compressive forces from deep-water currents and displacement of the floating offshore platform during storms.

For handling high fluid pressure within a double-ended flexible pipe joint, it is desired for the flexible pipe joint to include secondary elastomeric flex elements especially designed for containing the production fluid pressure within the flexible pipe joint. By containing the production fluid pressure within the flexible pipe joint, the secondary flex elements may eliminate production fluid pressure upon primary flex elements that carry the bulk of the axial, angular displacement, and torsion loads upon the flexible pipe joint. By eliminating the production fluid pressure upon the primary flex elements, the size of the primary flex elements can be reduced, and their lifetime can be extended. However, a reduction in the size of the primary flex elements should not require a significant increase in the overall size of the flexible joint to accommodate the secondary elastomeric flex elements. In addition, it is desired to provide secondary flex elements that are not subjected to axial compression from axial compression loading upon the flexible pipe joint.

Figure 2:
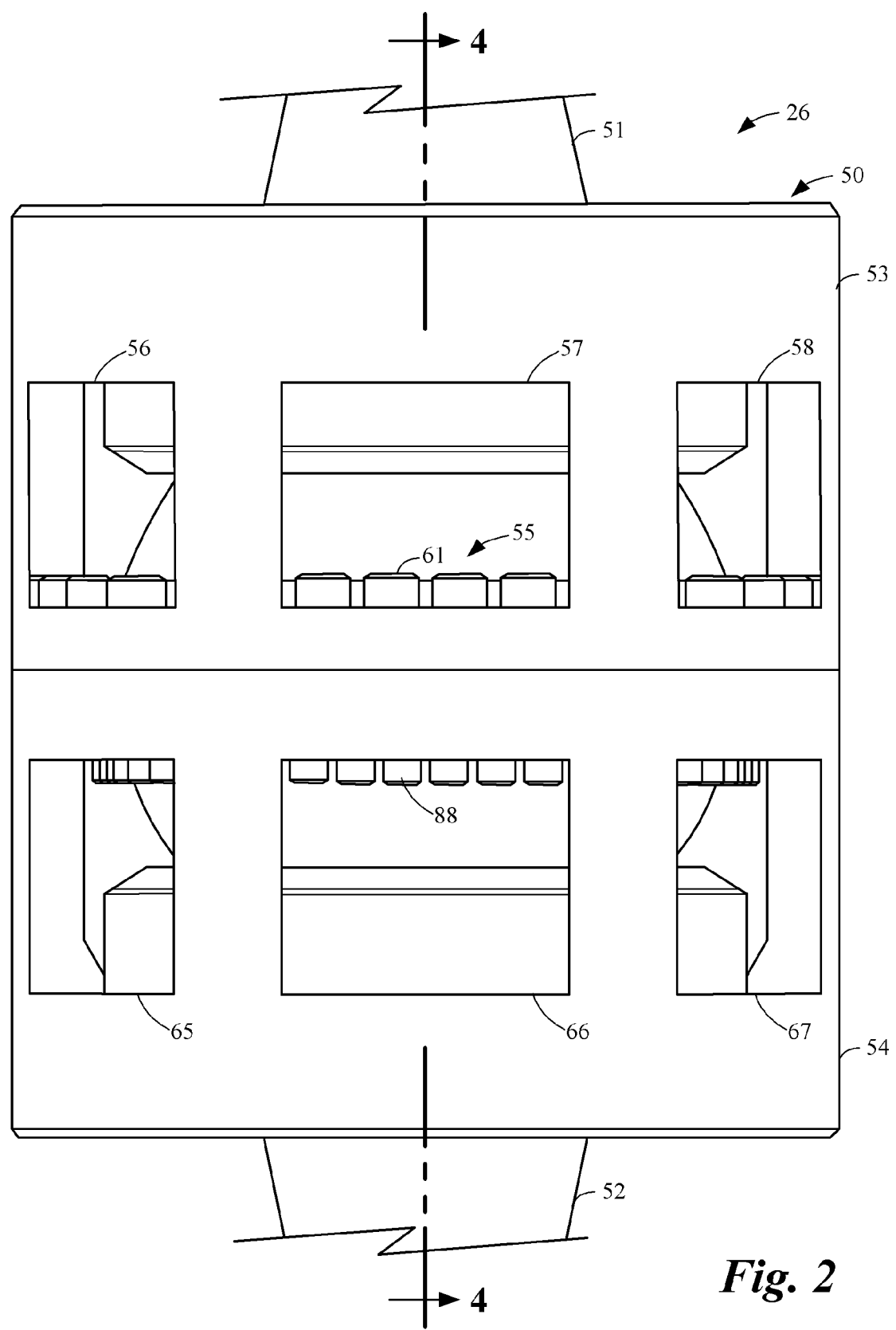
FIG. 2 is a front view of a double-ended flexible pipe joint used in the risers of FIG. 1.

FIG. 2 shows the preferred double-ended flexible pipe joint 26 in greater detail. The flexible pipe joint 26 has a cylindrical outer housing 50, an upper extension pipe 51 extending from an upper end of the outer housing 50, and a lower extension pipe 52 extending from a lower end of the outer housing 50.

Figure 3:
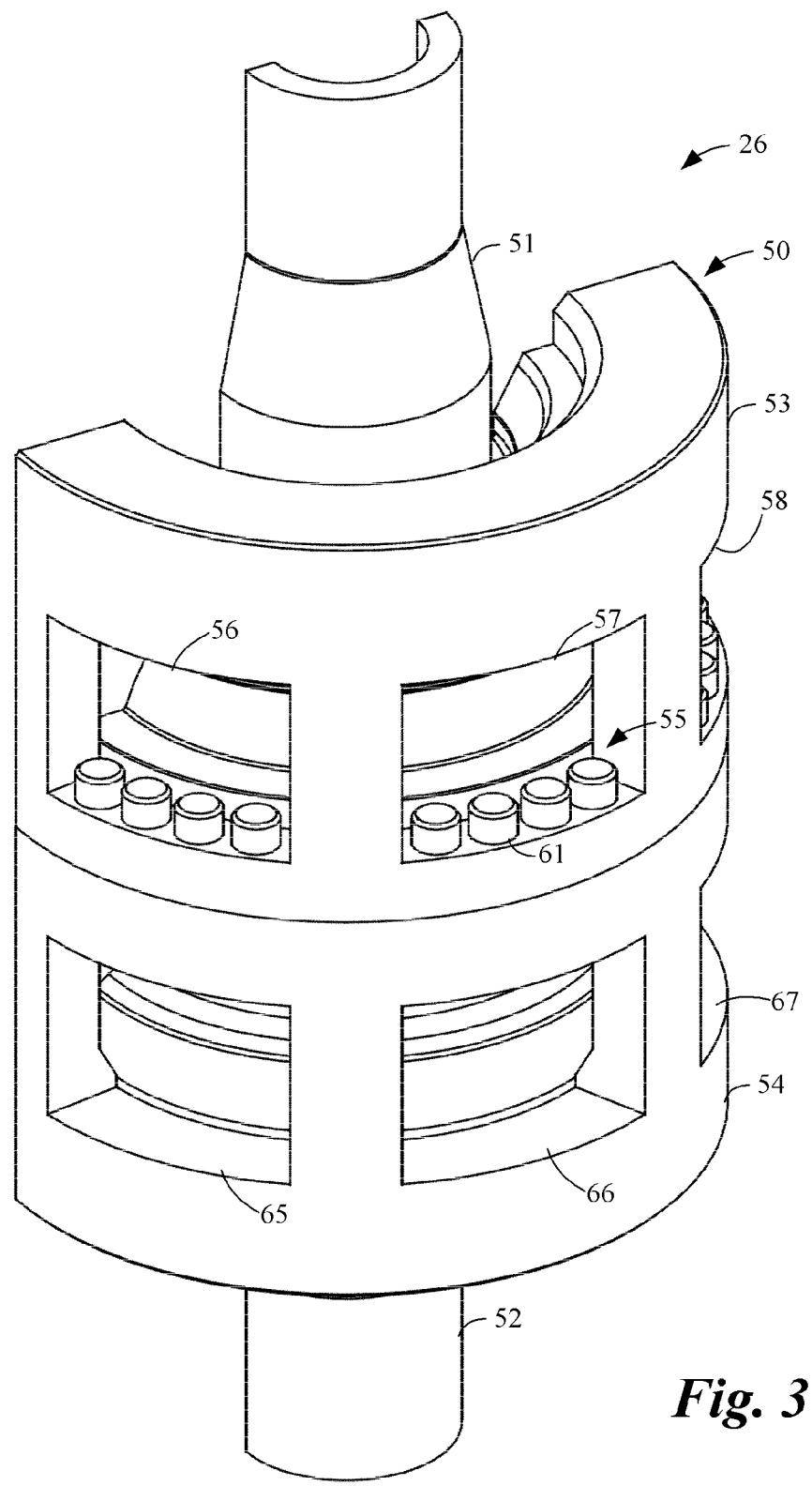
FIG. 3 is an isometric view of the front half of the double-ended flexible pipe joint shown in FIG. 2.

The outer housing 50 is comprised of an upper half 53 and a lower half 54 secured together by bolts 55. As more clearly shown in FIG. 3, the heads of the bolts 55 are disposed in six upper windows 56, 57, 58, etc., cut in the outer periphery of the upper half 53 of the outer housing 50 and spaced about the circumference of the outer housing. Each of the upper window 56, 57, 58 receives four of the bolts 55. The outer periphery of the lower half 54 of the outer housing also has six lower windows 65, 66, 67, etc., cut in its outer periphery of the lower half 54 of the outer housing 50 and spaced about the outer circumference of the outer housing. The upper and lower windows 56, 57, 58, 65, 66, 67, etc., permit circulation of seawater for removal of heat from the flexible pipe joint 26 when high temperature production fluid is conveyed between the extension pipes 51, 52 though the flexible pipe joint.

Figure 4:
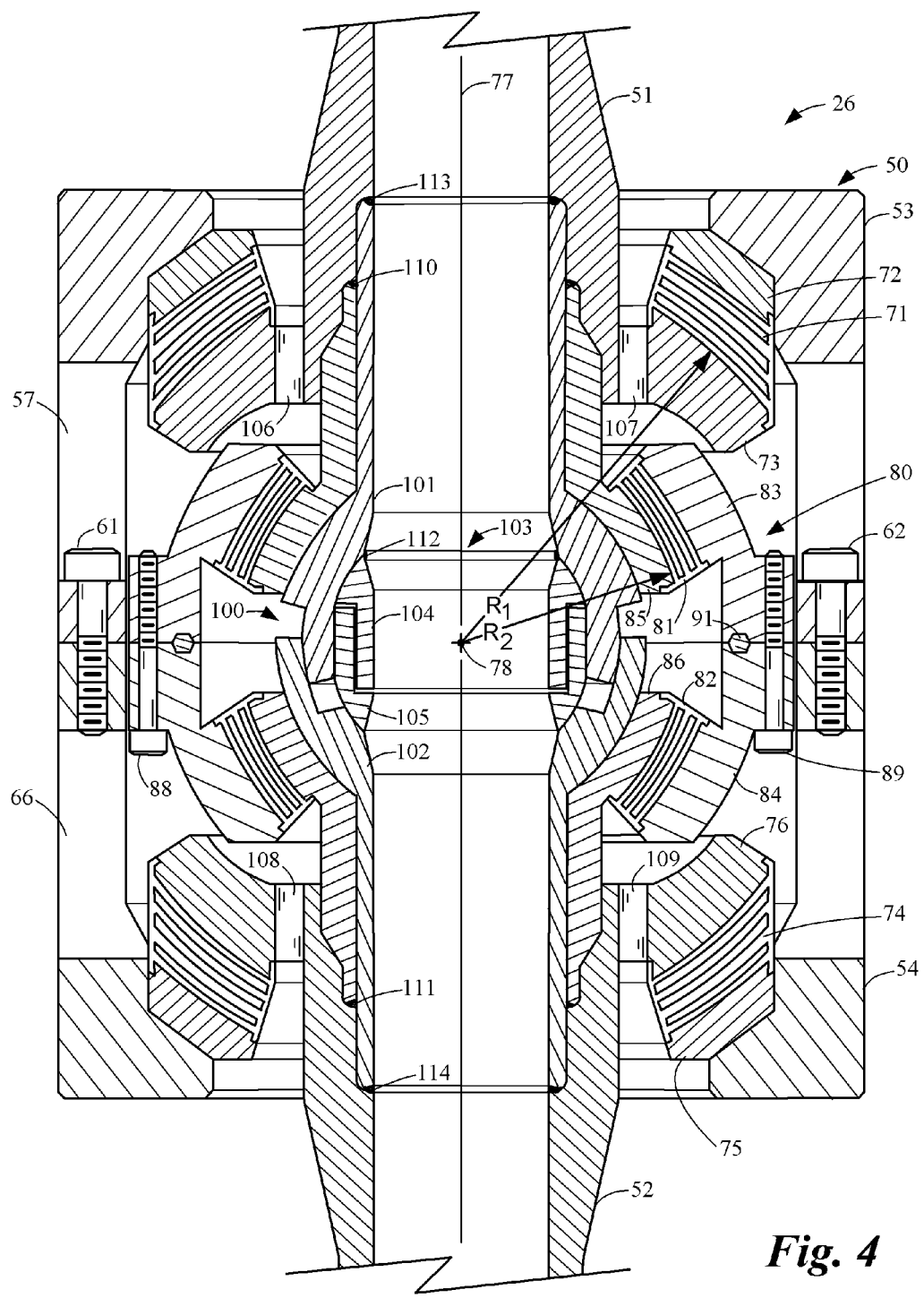
FIG. 4 is a lateral cross-section of the double-ended flexible pipe joint along line 4-4 in FIG. 2.

As shown in FIG. 4, an upper primary annular elastomeric flex element 71 mounts the upper extension pipe 51 to the upper half 53 of the outer housing. In particular, elastomer of the upper primary flex joint 71 is bonded to an upper load ring 72 and elastomer of the upper primary flex joint 71 is bonded to an outer flange 73 of the upper extension pipe 51. The upper load ring 72 is seated in the upper half 53 of the outer housing 50. In a similar fashion, a lower primary annular elastomeric flex joint 74 mounts the lower extension pipe 52 to the lower half 54 of the outer housing 50. In particular, elastomer of the lower primary flex joint 74 is bonded to a lower load ring 75 and elastomer of the lower primary flex joint 74 is bonded to an outer flange 76 of the lower extension pipe 52. The lower load ring 75 is seated in the lower half 54 of the outer housing 50.

The upper primary flex element 71 and the lower primary flex element 74 are stacked in a coaxial fashion about a central longitudinal axis 77 of the flexible pipe joint 26. The upper primary flex element 71 and the lower primary flex element 74 also share a common center of rotation 78 and are disposed from the center of rotation by a common radius $R_1$. The upper primary flex element 71 and the lower primary flex element 74 also have a similar shape and composition, so that axial tension loads, angular displacement loads, and torsion loads upon the flexible pipe joint 26 from the upper and lower extension pipes 51, 52 are shared between the primary flex elements 71, 74. A load upon the flexible pipe joint 26 from the upper and lower extension pipes 51, 52 causes deformation or strain in the upper primary flex element 71 and causes a deformation or strain in the lower primary flex element 74 such that the deformation or strain caused in the upper primary flex element 72 is substantially the same as the deformation or strain caused in the lower primary flex element 74.

To increase the load bearing capacity or useable lifetime of the double-ended flexible pipe joint 26 for a given outer housing size, a number of secondary annular elastomeric flex elements 81, 82 are included in the outer housing 50. The primary flex elements 71, 74 handle axial tension loads and angular displacement loads and torsion loads upon the flexible pipe joint, and the secondary flex elements 81, 82 contain production fluid pressure within the flexible pipe joint. In particular, the primary flex elements 71, 74 ensure that axial tension and angular displacement loads upon the pipe joint do not cause axial or angular displacement that is excessive for the secondary flex elements 81, 82. The secondary flex elements eliminate production fluid pressure upon the primary flex elements.

FIG. 4 shows a preferred configuration including an upper secondary flex element 81 and a lower secondary flex element 82. The secondary flex elements 81 and 82 are stacked in a coaxial fashion about the central longitudinal axis 77 of the pipe joint 26. The secondary flex elements 81 and 82 also share the common center of rotation 78 with the primary flex elements 71 and 74 and are disposed from the center of rotation by a common radius $R_2$. The common radius $R_2$ of the secondary flex elements 81 and 82 is smaller than the common radius $R_1$ of the primary flex elements 81 and 82. In addition, the secondary flex elements 81 and 82 are mounted to the inner housing 80 and the upper and lower extension pipes 51 and 52 in such a way that the secondary flex elements contain production fluid pressure within the extension pipes so that the primary flex elements 71, 74 are not subjected to the production fluid pressure.

As shown in FIG. 4, the upper secondary flex element 81 mounts the upper extension pipe 51 to an upper half 83 of an inner housing 80, and the lower secondary flex element 82 mounts the lower extension pipe 52 to a lower half 84 of the inner housing. In particular, elastomer of the upper secondary flex element 81 is bonded to the upper half 83 of the inner housing 80 and elastomer of the upper secondary flex element 81 is bonded to an inner flange 85 of the upper extension pipe 51. Elastomer of the lower secondary flex element 82 is bonded to the lower half 84 of the inner housing 80 and elastomer of the lower secondary flex element 82 is bonded to an inner flange 86 of the lower extension pipe 52.

The inner housing 80 is disposed within the outer housing 50. A circular array of bolts 88, 89 fasten the upper half 83 of the inner housing 80 to the lower half 84 of the inner housing. An elastomeric O-ring 91 is clamped between the upper half 83 of the inner housing 80 and the lower half 84 of the inner housing to contain production fluid pressure within the inner housing.

The primary flex elements 71, 74 and the outer flanges 73, 76 of the extension pipes 51, 52 are configured and enclosed within the outer housing 50 so that tension applied to the upper and lower extension pipes 51, 52 places the primary flex elements in compression. In a similar fashion, the secondary flex elements 81, 82 and the inner flanges 85, 86 of the extension pipes 51, 52 are configured and enclosed within the inner housing 80 so that tension applied to the upper and lower extension pipes 51, 52 places the secondary flex elements 81, 82 in compression. This is desired because under normal conditions, when the double-ended flexible pipe joint 26 is used in a riser, tension is applied to the upper and lower extension pipes 51, 52, and the primary and secondary elastomeric flex elements 71, 14, 81, 82 can withstand a greater level of compression than tension. Nevertheless, it is desired for the flexible pipe joint 50 to withstand a high-level of axial compressive force applied to the upper and lower extension pipes 51, 52 under abnormal conditions.

In order for the flexible pipe joint 26 to withstand a high level of axial compressive force under abnormal conditions, a ball-and-socket joint 100 is disposed about the common center of rotation 78 and mounted between the inner flange 85 of the upper extension pipe 51 and the inner flange 86 of the lower extension pipe 52. The ball-and-socket joint 100 includes an upper section 101 inserted into the upper extension pipe 51, and a lower section 102 inserted into lower extension pipe 52.

A heat shield 103 is disposed about the common center of rotation 78 between the upper section 101 and the lower section 102 of the ball-and-socket joint 100. The heat shield 103 is in the form of a sphere having an axial cylindrical hole and an axial outer cylindrical surface. The outer cylindrical surface of the heat shield 103 fits within a cylindrical recess in the upper section 101 of the ball-and-socket joint 100. The heat shield 103 itself includes an upper section 104 and a lower section 105.

As will be further described below with reference to FIGS. 6, 7, and 8, the ball-and-socket joint 100 and the heat shield 103 are configured to permit some axial displacement of the upper sections 101, 104 with respect to the lower sections 102, 105 as well as angular displacement and rotation of the upper sections 101, 104 with respect to the lower sections 102, 105 while resisting a flow of heat from hot production fluid within the extension pipes 51, 52 to the secondary flex elements 81, 82. In addition, to assist cooling of the primary and secondary flex elements 71, 74, 81, 82, the outer flange 73 of the upper extension pipe 51 is provided with a circular array of axial holes 106, 107 to permit convective circulation of seawater through the upper windows 56, 57, 58, etc., in the outer housing and through the array of holes 106, 107 in the upper primary flex element 71. In a similar fashion, the outer flange 76 of the lower extension pipe 52 is provided with a circular array of axial holes 108, 109 to permit convective circulation of seawater through the array of holes 108, 109 in the lower primary flex element 74 and through the lower windows 65, 66, 67, etc., in the outer housing 50.

In use, when conveying production fluid through a riser or through a sub-sea pipeline, the production fluid flows along the central axis 77 between the extension pipes 51, 52 and through the ball-and-socket joint 100 and through the heat shield 103.

Figure 5:
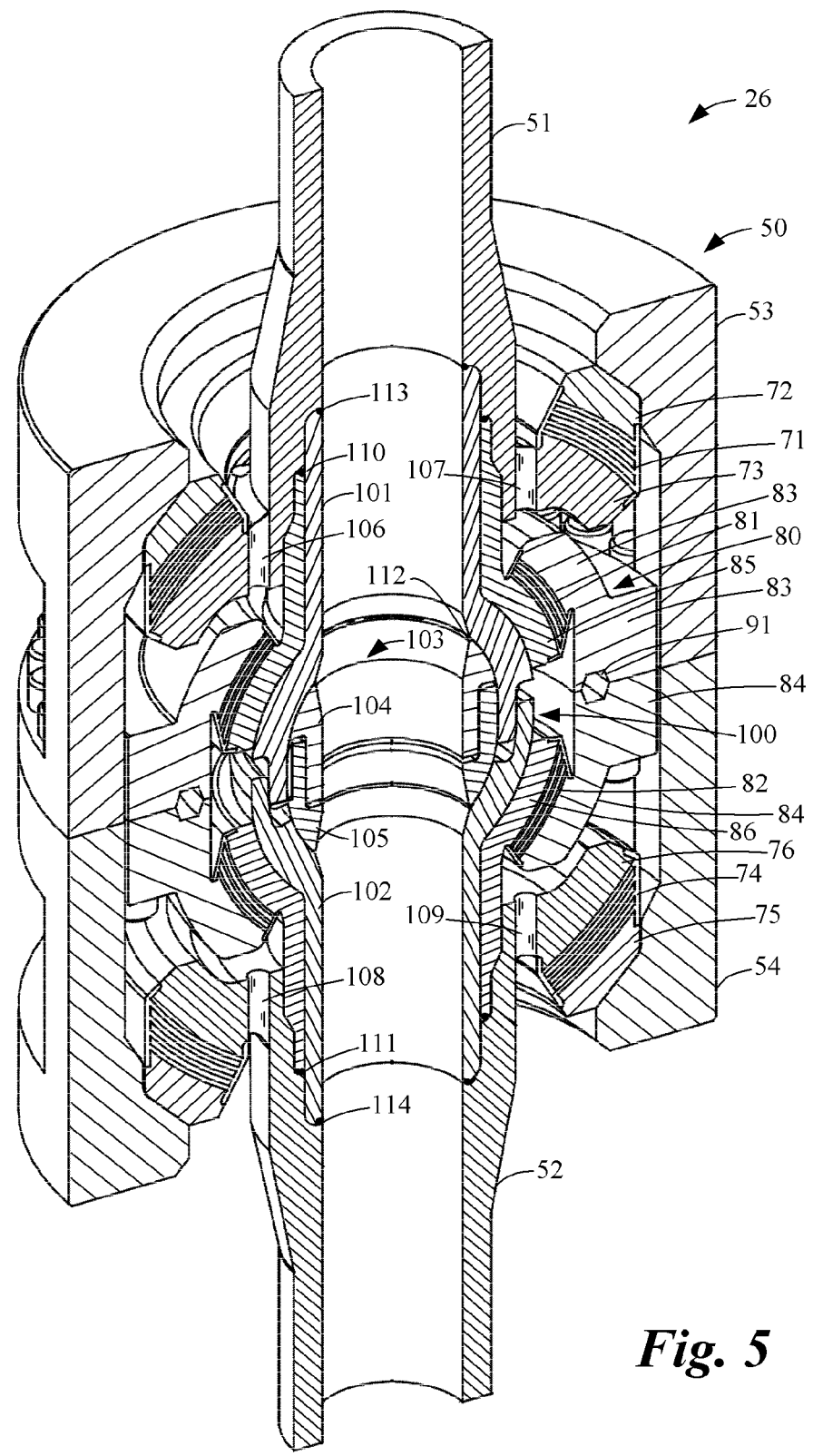
FIG. 5 is an isometric view of the rear half of the double-ended flexible pipe joint shown in FIG. 2.

For construction of the flexible pipe joint 26, each of the two primary flex elements 71, 74 and each of the two secondary flex elements 81, 82 are molded separately. Each flex element 71, 74, 81, 82 consists of alternating spherical shims of metal, or other stiff material, and layers of elastomeric material. The alternating layers of reinforcement and elastomeric material are clamped in a mold and subjected to heat and pressure to form a unitary molded assembly. For example, details of the molding process are found in FIG. 5 and column 5 line 47 to column 6 line 2 of McGregor U.S. Pat. No. 4,708,758 issued Nov. 24, 1987.

Because the primary flex elements 71, 74 are cooled by the circulation of seawater and are not subjected to pressure of the production fluid, they may be molded from conventional elastomer such as vulcanized nitrile butadiene rubber (NBR) including 40 to 45 parts per hundred of carbon black and/or silica filler. On the other hand, the secondary flex elements 81, 82 may be molded from a more heat-resistant elastomer composition having a lower modulus of elasticity, because the secondary flex elements are less well cooled by the circulation of seawater and need not provide much resistance to axial tension, angular displacement, or torsion loads upon the flexible pipe joint. For example, the secondary flex elements 81, 82 may be molded from vulcanized nitrile butadiene rubber (NBR) including 5 to 10 parts per hundred of carbon black and/or silica filler, or the secondary flex elements 81, 82 may be molded from a more temperature-resistant elastomer such as peroxide-cured hydrogenated nitrile butadiene rubber (HNBR).

Molding of the upper primary flex element 71 produces an upper primary flex element assembly consisting of the upper primary flex element 71, the upper load ring 72, and the upper extension pipe 51 including the outer flange 73. Molding of the lower primary flex element 74 produces a lower primary flex element assembly consisting of the lower primary flex element 74, the lower load ring 75, and the lower extension pipe 52 including the outer flange 76. The same mold can be used for molding the upper primary flex element 71 and the lower primary flex element 74.

Molding of the upper secondary flex element 81 produces an upper secondary flex element assembly consisting of the upper secondary flex element 81, the upper half 83 of the inner housing 80, and the inner flange 85 of the of the upper extension pipe 51. When the upper secondary flex element 81 is molded, the inner flange 85 has not yet been assembled onto the upper extension pipe 51. Molding of the lower secondary flex element 82 produces a lower secondary flex element assembly consisting of the lower secondary flex element 82, the lower half 84 of the inner housing 80, and the inner flange 86 of the of the lower extension pipe 52. When the lower secondary flex element 82 is molded, the inner flange 86 has not yet been assembled onto the lower extension pipe 52. The same mold can be used for molding the upper secondary flex element 81 and the lower secondary flex element 82.

After the flex elements have been molded, the upper primary flex element assembly is joined to the upper secondary flex element assembly by inserting the inner flange 85 onto the upper extension pipe 51 (the components being held upside-down at this time) and forming a circular weld 110 within the upper extension pipe 51 to weld the inner flange 85 to the upper extension pipe. In a similar fashion, the lower primary flex element assembly is joined to the lower secondary flex element assembly by inserting the inner flange 86 onto the lower extension pipe 52 and forming a circular weld 111 within the lower extension pipe 52 to weld the inner flange 86 to the lower extension pipe.

The upper section 104 of the heat shield 103 is inserted into the upper section 110 of the ball-and-socket joint 100 (the components being held upside-down at this time), and a circular weld 112 is formed within the upper section 101 to weld the upper section 104 of the heat shield 103 to the upper section of the ball-and-socket joint 100. Then the upper section 101 of the ball-and-socket joint 100 is inserted into the upper extension pipe 51 (the components being held upside-down at this time), and a circular weld 113 is formed within the upper extension pipe 51 to weld the upper section 101 of the ball-and-socket joint to the upper extension pipe 51. Then lower section 105 of the heat shield 103 is assembled into the upper section 103 of the heat shield 103. In a similar fashion, the lower section 102 of the ball-and-socket joint 100 is inserted into the lower extension pipe 52, and a circular weld 114 is formed within the lower extension pipe 52 to weld the lower section 102 of the ball-and-socket joint 100 to the lower extension pipe 52.

Then O-ring 91 is placed on the upper section 83 of the inner housing 80 (the components being held upside-down at this time), and the lower section 102 of the ball-and-socket joint 100 is assembled onto the upper section 101 of the ball-and-socket joint 100 so that the heat shield 103 is enclosed between the upper section 101 and the lower section 102 of the ball-and-socket joint 100 and the lower flex joint assembly is assembled onto the upper flex joint assembly to close the inner housing 83 and to close the outer housing 50. Then the bolts 88, 89, etc. are inserted through the lower windows 65, 66, 67, etc. in the outer housing 50 and tightened to secure the lower half 84 of the inner housing 50 to the upper half 83 of the inner housing. Then the bolts 61, 62, etc. are inserted through the upper windows 56, 57, 58, etc. in the outer housing, and tightened to secure the upper half 53 of the outer housing 50 to the lower half 54 of the outer housing.

Figure 6:
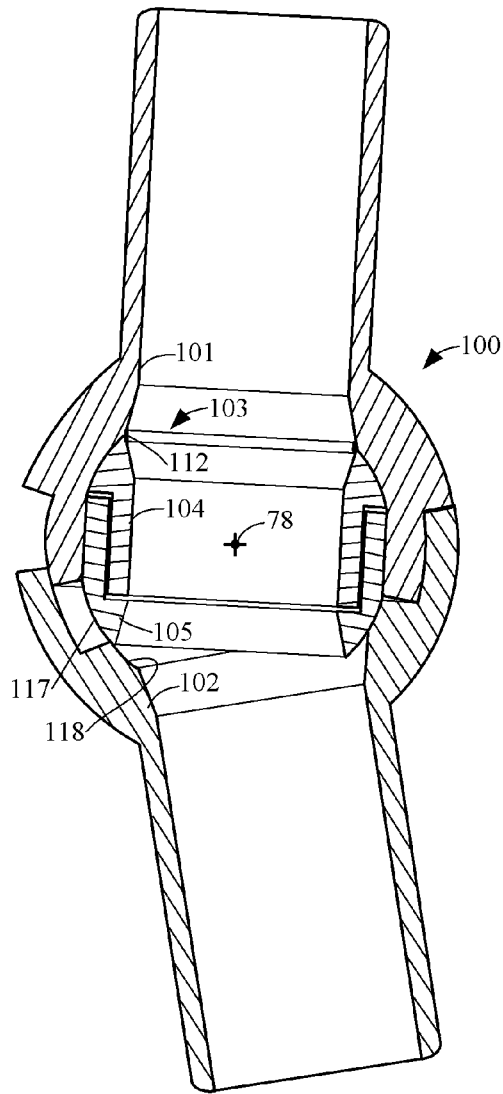
FIG. 6 shows a ball-and-socket joint of the double-ended flexible pipe joint of FIG. 2 for the case of an angular displacement between the axes of the extension pipes of the flexible pipe joint.

FIG. 6 shows the ball-and-socket joint 100 accommodating a maximum angular displacement between the extension pipes of up to about 15 degrees.

Figure 7:
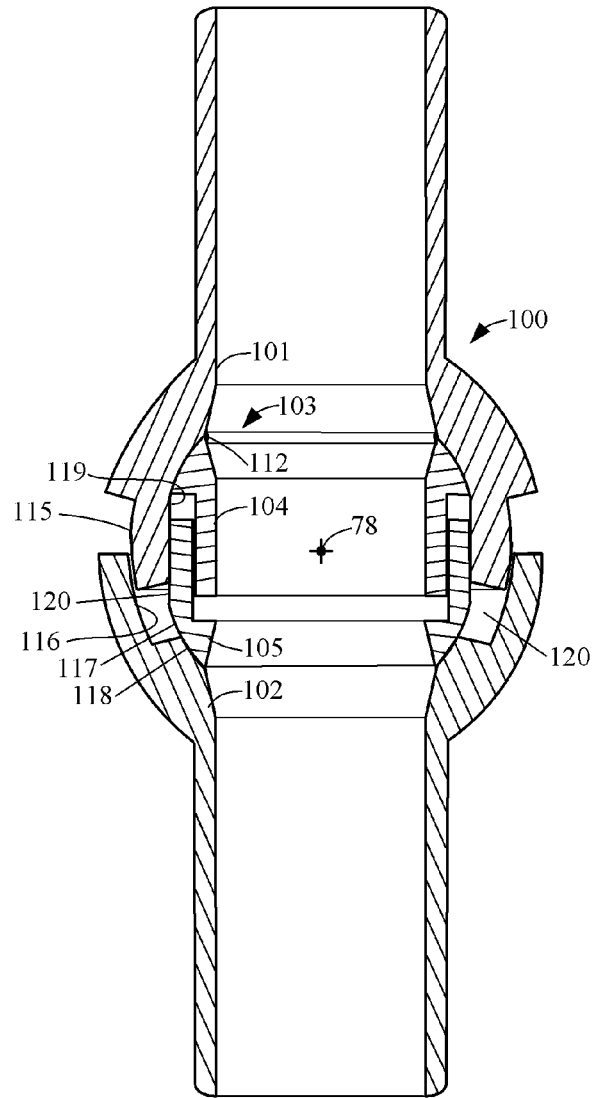
FIG. 7 shows the ball-and-socket joint of the double-ended flexible pipe joint of FIG. 2 for the case of axial tension upon the extension pipes of the flexible pipe joint.

FIG. 7 shows the ball-and-socket joint 100 accommodating a maximum level of axial tension for the case of zero angular displacement between the extension pipes. In this case, there is an axial displacement of the upper section 101 with respect to the lower section 102 of the ball-and-socket joint 100 so that the upper section 101 is displaced away from the lower section 102. This relative axial displacement creates a small gap between the respective mating spherical surfaces 115 and 116 of the upper section 101 and the lower section 102. However, there is a similar relative axial displacement of the lower section 105 of the heat shield 100 with respect to the upper section 101 of the ball-and-socket joint so that there still is close contact between respective mating spherical surfaces 117 and 118 at the lower end of the lower section of 105 of the heat shield and the lower section 105 of the heat shield. In particular, the lower section 105 of the heat shield has an outer cylindrical surface 120 having a loose clearance fit with a mating inner cylindrical surface 119 of the upper section 101 of the ball-and-socket joint. Therefore, under the force of gravity, the lower section 105 of the heat shield 100 moves axially with respect to the upper section 101 of the ball-and-socket joint 100 until the lower cylindrical surface 118 of the lower section 105 rests upon the mating cylindrical surface 118 of the lower section 102 of the ball-and-socket joint.

Figure 8:
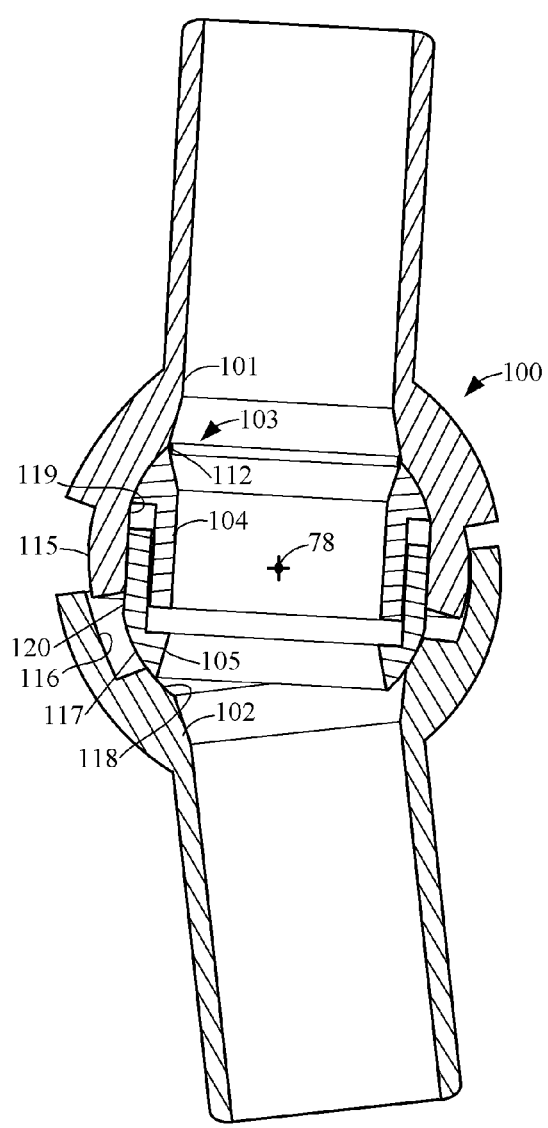
FIG. 8 shows the ball-and-socket joint of the double-ended flexible pipe joint of FIG. 2 for the combined case of an angular displacement between the axes of the extension pipes of the flexible pipe joint and axial tension upon the extension pipes.

FIG. 8 shows the ball-and-socket joint 100 accommodating a maximum angular displacement and axial displacement between the extension pipes. The loose clearance fit between the upper section 101 of the ball-and-socket joint 100 and the lower section 105 of the heat shield permits the lower section 105 to rotate with the upper section 101 while moving axially with respect to the lower section 101 in order to maintain close contact with the lower section 102 of the ball-and-socket joint.

As should be evident from FIGS. 4 and 6, the upper section 104 and lower 105 part of the heat shield 103 could be constructed from metal alloy in order to enhance the ability of the upper section 101 and the lower section 102 of the ball-and-socket joint 100 to engage with each other to resist axial compressive force upon the extension pipes. For example, the outer housing 50, the extension pipes 51, 52, the extension pipe flanges 73, 76, 85, 86, the inner housing 80, the ball-and-socket joint 100, and the heat shield 104, could all be made of low carbon steel, such ASTM A707 high-strength, low carbon steel. For additional resistance to heat at additional cost, the heat shield 103, or the heat shield 103 and the ball-and-socket joint 100, or the heat shield 103 and the ball-and-socket joint 100 and the inner flanges 85, 86, could be made of low heat conductivity metal alloy such as a nickel-chromium-iron alloy. The preferred nickel-chromium-iron alloy is Inconel brand alloy, which contains a minimum of 72% nickel and cobalt, 14-17% chromium, and 6-10 iron, such as 76% nickel, 17% chromium, and 7% iron.

By slightly shortening the axial length of the upper section 104 and the lower section 105 of the heat shield 103, any axial compressive load upon the extension pipes 51, 52 will be born entirely by the ball-and-socket joint 100 and none of the axial compressive load upon the extension pipes 51, 52 will be born by the heat shield 103. In this case, it is possible to make the heat shield 103 of a material having lower heat conductivity and lower strength. For example, the heat shield 103 could be made of a ceramic or ceramic composite material, or a polymer or polymer composite material. For example, a preferred polymer composite material is polyetheretherketone (PEEK) reinforced with 30 percent of randomly-oriented chopped glass fiber. The PEEK material, for example, is grade 450GL30 produced by Victrex plc, at Hillhouse International, Thornton Cleveleys, Lancashier, FY5 4QD England.

The assembly of the ball-and-socket joint 100 and the heat shield 103 can be provided with a means in addition to the force of gravity for maintaining engagement of the lower section 105 of the heat shield 103 with the lower section 102 of the ball-and-socket joint under varying axial tension upon the extension pipes. Therefore the engagement can be maintained when the flexible pipe joint is used in a horizontal subsea pipeline or when the flexible pipe joint is installed upside-down. One way of providing such a means is to permanently magnetize the lower section 105 of the heat shield 103 so that is magnetically attracted to the lower section 102 of the ball-and-socket joint 100. Another way of providing such a means is to include a suitable spring in the assembly.

In order to permanently magnetize the lower section 105 of the heat shield 103 so that is magnetically attracted to the lower section 102 of the ball-and-socket joint 100, the lower section 102 of the heat shield is made of a material capable of holding a permanent magnetization at the temperature of the production fluid, and the lower section 102 of the ball-and-socket joint is made of a material that is ferromagnetic at the temperature of the production fluid. For example, the lower section 102 of the heat shield 104 is made of permanent magnet steel or ALNICO alloy, and the lower section 102 of the ball-and-socket joint 100 is made of ASTM A707 high-strength, low carbon steel. The permanent magnet steel, for example, is quenched carbon steel consisting primarily of iron and having 0.15-0.3 percent carbon, or quenched cobalt steel consisting primarily of iron and having 30-40 percent cobalt, 5-9 percent tungsten, and 1.5 to 3 percent chromium. The ALNICO alloy, for example, is ALNICO alloy 11 having 7 percent aluminum, 24 percent cobalt, 3 percent copper, 30 percent iron, 14 percent nickel, 1.5 percent silicon, and 0.3 percent titanium. The lower section 102 of the heat shield 104 is magnetized, for example, in the assembly as shown in FIG. 7 by placing an electromagnet coil in the annulus 120 in FIG. 7, and pulsing the electromagnet coil with electrical current.

Figure 9:
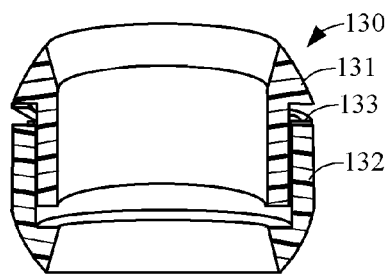
FIG. 9 shows an alternative construction for the heat shield in the ball-and-socket joint of the double-ended flexible pipe joint of FIG. 2.
Figure 10:
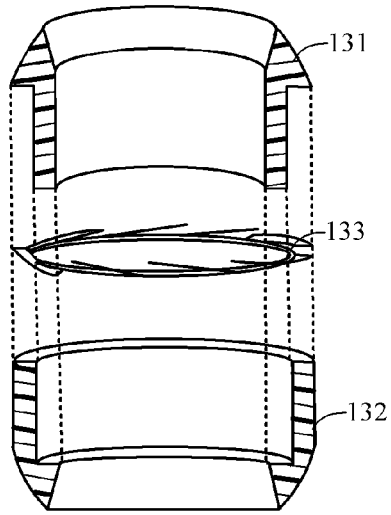
FIG. 10 shows a step of assembling together parts of the heat shield shown in FIG. 9.
Figure 11:
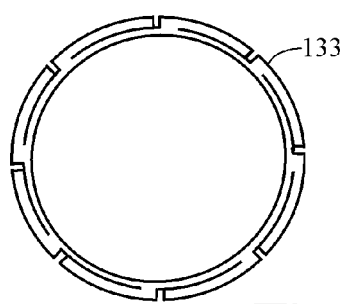
FIG. 11 shows a top view of a spring used in the heat shield of FIG. 9.

FIGS. 9, 10, and 11 show a spring 133 used in an assembly of a heat shield 130 made of polymer such as PEEK reinforced with glass fiber. The spring 133 has an outer diameter slightly smaller than the outer diameter of the lower section 132 of the heat shield, and an inner diameter matching the inner diameter of the top of the lower section 132. Therefore the spring 133 fits on top of the lower section 132 between the upper section 131 and the lower section 132 of the hest shield 130. The spring 133 may have any one of various possible shapes, such as a helical shape, or a cylindrical shape having multiple protruding leaves.

As shown in FIGS. 10 and 11, the spring 123 has a plurality of upwardly protruding leaves about its circumference. When the upper section 131 and the lower section 132 of the heat shield are forced together, the spring 123 assumes a flat configuration.

In view of the above, there has been described a double-ended flexible joint having first and second extension pipes extending from opposite ends of an outer housing, and first and second primary annular elastomeric flex elements mounting the first and second extension pipes to the outer housing. An inner housing is disposed in the outer housing, and first and second secondary annular elastomeric flex elements disposed in the inner housing mount the first and second extension pipes to the inner housing. Tension upon the first and second extension pipes place each of the first and second primary flex elements and each of the first and second secondary flex elements in compression. The first and second secondary flex elements contain fluid pressure within the first and second extension pipes so that the first and second primary flex elements are not subjected to the fluid pressure within the first and second extension pipes. Therefore the primary flex elements are designed especially for carrying the angular displacement and the bulk of the axial and torsion loading upon the flexible pipe joint, and the secondary flex elements are designed for carrying the angular displacement also, but especially for carrying the fluid pressure load, resulting in a more compact and light-weight double-ended flexible pipe joint.

What is claimed is:

1. A double-ended flexible pipe joint comprising:
an outer housing;
a first extension pipe extending from a first end of the housing;
a second extension pipe extending from a second end of the housing;
a first primary annular elastomeric flex element disposed in the housing and mounting the first extension pipe to the housing;
a second primary annular elastomeric flex element disposed in the housing and mounting the second extension pipe to the housing;
an inner housing disposed within the outer housing;
a first secondary annular elastomeric flex element disposed in the inner housing and mounting the first extension pipe to the inner housing; and
a second secondary annular elastomeric flex element disposed in the inner housing and mounting the second extension pipe to the inner housing;
wherein tension upon the first and second extension pipes places each of the first and second primary flex elements and each of the first and second secondary flex elements in compression; and
wherein the first and second secondary flex elements are mounted to the inner housing for containing fluid pressure within the first and second extension pipes so that the first and second primary flex elements are not subjected to the fluid pressure within the first and second extension pipes.

2. The double-ended flexible pipe joint as claimed in claim 1, wherein the first and second primary flex elements and the first and second secondary flex elements are stacked in a coaxial fashion and share a common center of rotation, the first and second primary flex elements are disposed at a common first radius from the common center of rotation, the first and second secondary flex elements are disposed at a common second radius from the common center of rotation, and the second radius is smaller than the first radius.

3. The double-ended flex joint as claimed in claim 1, further comprising a ball-and-socket joint disposed within the outer housing and disposed within the inner housing and coupling the first extension pipe to the second extension pipe and preventing axial compression upon the first and second extension pipes from causing tension upon the first and second primary flex elements and from causing tension upon the first and second secondary flex elements.

4. The double-ended flex joint as claimed in claim 3, wherein the ball-and-socket joint includes a first section mounted to the first extension pipe and a second section mounted to the second extension pipe, and wherein the double-ended flex joint includes a heat shield disposed within the ball-and-socket joint, the heat shield having an outer cylindrical surface mating with an inner cylindrical surface of the first section of the ball-and-socket joint, and an outer spherical surface mating with the second section of the ball-and-socket joint.

5. The double-ended flexible pipe joint as claimed in claim 3, wherein the ball-and-socket joint includes a first section mounted to the first extension pipe and a second section mounted to the second extension pipe, and wherein the double-ended flex joint further includes a heat shield disposed within the ball-and-socket joint, and a spring mounted for urging at least a portion of the heat shield to move away from the first section of the ball-and-socket joint and toward the second section of the ball-and-socket joint to engage the second section of the ball-and-socket joint.

6. The double-ended flexible pipe joint as claimed in claim 3, wherein the ball-and-socket joint includes a first section mounted to the first extension pipe and a second section mounted to the second extension pipe, and wherein the double-ended flex joint further includes a heat shield disposed within the ball-and-socket joint, and wherein at least a portion of the heat shield is mounted to the first section of the ball-and-socket joint for movement away from the first section of the ball-and-socket joint and toward the second section of the ball-and-socket joint, and said portion of the heat shield is magnetized to attract and engage with the second section of the ball-and-socket joint.

7. The double-ended flexible pipe joint as claimed in claim 1, wherein the outer housing has an outer circumference and a series of openings in the outer circumference, the first primary flex element is mounted to a flange of the first extension pipe and the flange of the first extension pipe has a first series of holes around the first extension pipe, and the second primary flex element is mounted to a flange of the second extension pipe and the flange of the second extension pipe has a second series of holes around the second extension pipe, so that water may circulate thought the openings in the outer circumference of the outer housing and through the first series of holes and through the second series of holes for cooling of the first and second primary flex elements.

8. A double-ended flexible pipe joint comprising:
An outer housing having a first end and a second end;
a first extension pipe extending from the first end of the outer housing, the first extension pipe having an inner flange within the outer housing and an outer flange within the outer housing;
a first primary annular elastomeric flex element disposed within the outer housing and mounting the outer flange of the first extension pipe to the outer housing;
a second extension pipe extending from the second end of the outer housing, the second extension pipe having an inner flange within the outer housing and an outer flange within the outer housing;
a second primary annular elastomeric flex element disposed within the outer housing and mounting the outer flange of the second extension pipe to the outer housing;
an inner housing disposed within the outer housing, the inner flange of the first extension pipe being disposed within the inner housing, and the inner flange of the second extension pipe being disposed within the inner housing;
a first secondary annular elastomeric flex element disposed within the inner housing and mounting the inner flange of the first extension pipe to the inner housing; and
a second secondary annular elastomeric flex element disposed within the inner housing and mounting the inner flange of the second extension pipe to the inner housing;
wherein tension upon the first and second extension pipes places each of the first and second primary flex elements and each of the first and second secondary flex elements in compression; and
wherein the first and second secondary flex elements are mounted to the inner housing for containing fluid pressure within the first and second extension pipes so that the first and second primary flex elements are not subjected to the fluid pressure within the first and second extension pipes.

9. The double-ended flexible pipe joint as claimed in claim 8, wherein the first and second primary flex elements and the first and second secondary flex elements are stacked in a coaxial fashion and share a common center of rotation, the first and second primary flex elements are disposed at a common first radius from the common center of rotation, the first and second secondary flex elements are disposed at a common second radius from the common center of rotation, and the second radius is smaller than the first radius.

10. The double-ended flex joint as claimed in claim 8, further comprising a ball-and-socket joint disposed within the outer housing and disposed within the inner housing and coupling the first extension pipe to the second extension pipe and preventing axial compression upon the first and second extension pipes from causing tension upon the first and second primary flex elements and from causing tension upon the first and second secondary flex elements.

11. The double-ended flex joint as claimed in claim 10, wherein the ball-and-socket joint includes a first section mounted to the first extension pipe and a second section mounted to the second extension pipe, and wherein the double-ended flex joint further includes a heat shield disposed within the ball-and-socket joint, the heat shield having an outer cylindrical surface mating with an inner cylindrical surface of the first section of the ball-and-socket joint, and an outer spherical surface mating with the second section of the ball-and-socket joint.

12. The double-ended flexible pipe joint as claimed in claim 10, wherein the ball-and-socket joint includes a first section mounted to the first extension pipe and a second section mounted to the second extension pipe, and wherein the double-ended flex joint further includes a heat shield disposed within the ball-and-socket joint, and a spring mounted for urging at least a portion of the heat shield to move away from the first section of the ball-and-socket joint and toward the second section of the ball-and-socket joint to engage the second section of the ball-and-socket joint.

13. The double-ended flexible pipe joint as claimed in claim 10, wherein the ball-and-socket joint includes a first section mounted to the first extension pipe and a second section mounted to the second extension pipe, and wherein the double-ended flex joint further includes a heat shield disposed within the ball-and-socket joint, and wherein at least a portion of the heat shield is mounted to the first section of the ball-and-socket joint for movement away from the first section of the ball-and-socket joint and toward the second section of the ball-and-socket joint, and said portion of the heat shield is magnetized to attract and engage with the second section of the ball-and-socket joint.

14. The double-ended flexible pipe joint as claimed in claim 8, wherein the outer housing has an outer circumference and a series of openings in the outer circumference, the outer flange of the first extension pipe has a first series of holes around the first extension pipe, and the outer flange of the second extension pipe has a second series of holes around the second extension pipe, so that water may circulate thought the openings in the outer circumference of the outer housing and through the first series of holes and through the second series of holes for cooling of the first and second primary flex elements.

15. A double-ended flexible pipe joint comprising:
An outer housing having a first end and a second end;
a first extension pipe extending from the first end of the outer housing, the first extension pipe having an inner flange within the outer housing and an outer flange within the outer housing;
a first primary annular elastomeric flex element disposed within the outer housing and mounting the outer flange of the first extension pipe to the outer housing;
a second extension pipe extending from the second end of the outer housing, the second extension pipe having an inner flange within the outer housing and an outer flange within the outer housing;
a second primary annular elastomeric flex element disposed within the outer housing and mounting the outer flange of the second extension pipe to the outer housing;
an inner housing disposed within the outer housing, the inner flange of the first extension pipe being disposed within the inner housing, and the inner flange of the second extension pipe being disposed within the inner housing;
a first secondary annular elastomeric flex element disposed within the inner housing and mounting the inner flange of the first extension pipe to the inner housing; and
a second secondary annular elastomeric flex element disposed within the inner housing and mounting the inner flange of the second extension pipe to the inner housing;
wherein tension upon the first and second extension pipes places each of the first and second primary flex elements and each of the first and second secondary flex elements in compression; and
wherein the first and second primary flex elements and the first and second secondary flex elements are stacked in a coaxial fashion and share a common center of rotation, the first and second primary flex elements are disposed at a common first radius from the common center of rotation, the first and second secondary flex elements are disposed at a common second radius from the common center of rotation, and the second radius is smaller than the first radius.

16. The double-ended flex joint as claimed in claim 15, further comprising a ball-and-socket joint disposed within the outer housing and disposed within the inner housing and coupling the first extension pipe to the second extension pipe and preventing axial compression upon the first and second extension pipes from causing tension upon the first and second primary flex elements and from causing tension upon the first and second secondary flex elements.

17. The double-ended flex joint as claimed in claim 16, wherein the ball-and-socket joint includes a first section mounted to the first extension pipe and a second section mounted to the second extension pipe, and wherein the double-ended flex joint further includes a heat shield disposed within the ball-and-socket joint, the heat shield having an outer cylindrical surface mating with an inner cylindrical surface of the first section of the ball-and-socket joint, and an outer spherical surface mating with the second section of the ball-and-socket joint.

18. The double-ended flexible pipe joint as claimed in claim 16, wherein the ball-and-socket joint includes a first section mounted to the first extension pipe and a second section mounted to the second extension pipe, and wherein the double-ended flex joint further includes a heat shield disposed within the ball-and-socket joint, and a spring mounted for urging at least a portion of the heat shield to move away from the first section of the ball-and-socket joint and toward the second section of the ball-and-socket joint to engage the second section of the ball-and-socket joint.

19. The double-ended flexible pipe joint as claimed in claim 16, wherein the ball-and-socket joint includes a first section mounted to the first extension pipe and a second section mounted to the second extension pipe, and wherein the double-ended flex joint further includes a heat shield disposed within the ball-and-socket joint, and wherein at least a portion of the heat shield is mounted to the first section of the ball-and-socket joint for movement away from the first section of the ball-and-socket joint and toward the second section of the ball-and-socket joint, and said portion of the heat shield is magnetized to attract and engage with the second section of the ball-and-socket joint.

20. The double-ended flexible pipe joint as claimed in claim 15, wherein the outer housing has an outer circumference and a series of openings in the outer circumference, the outer flange of the first extension pipe has a first series of holes around the first extension pipe, and the outer flange of the second extension pipe has a second series of holes around the second extension pipe, so that water may circulate thought the openings in the outer circumference of the outer housing and through the first series of holes and through the second series of holes for cooling of the first and second primary flex elements.

* * * * *